US 9,879,977 B2

(12) United States Patent
Shchegrov

(10) Patent No.: US 9,879,977 B2
(45) Date of Patent: Jan. 30, 2018

(54) APPARATUS AND METHOD FOR OPTICAL METROLOGY WITH OPTIMIZED SYSTEM PARAMETERS

(71) Applicant: KLA-Tencor Corporation, Milpitas, CA (US)

(72) Inventor: Andrei V. Shchegrov, Campbell, CA (US)

(73) Assignee: KLA-Tencor Corporation, Milpitas, CA (US)

(*) Notice: Subject to any disclaimer, the term of this patent is extended or adjusted under 35 U.S.C. 154(b) by 3 days.

(21) Appl. No.: 14/073,538

(22) Filed: Nov. 6, 2013

(65) Prior Publication Data
US 2014/0132948 A1 May 15, 2014

Related U.S. Application Data

(60) Provisional application No. 61/724,722, filed on Nov. 9, 2012.

(51) Int. Cl.
G01B 11/02 (2006.01)
G01B 11/06 (2006.01)

(52) U.S. Cl.
CPC ............ *G01B 11/02* (2013.01); *G01B 11/065* (2013.01); *G01B 11/0641* (2013.01)

(58) Field of Classification Search
CPC .... G01B 11/02; G01B 11/0641; G01B 11/065
See application file for complete search history.

(56) References Cited

U.S. PATENT DOCUMENTS 5,608,526 A    3/1997  Piwonka-Corle et al.
5,859,424 A    1/1999  Norton et al.
(Continued)

FOREIGN PATENT DOCUMENTS

JP      2003508772 A       3/2003
WO   WO 2005031315 A1 *   4/2005   ............... G01J 3/02

OTHER PUBLICATIONS

International Search Report and Written Opinion mailed on Feb. 12, 2014, for PCT Application No. PCT/US2013/069138 filed on Nov. 8, 2013, by KLA-Tencor Corporation, 13 pages.
(Continued)

*Primary Examiner* — Dominic J Bologna
(74) *Attorney, Agent, or Firm* — Spano Law Group; Joseph S. Spano

(57) ABSTRACT

Methods and systems for achieving a small measurement box size specification across a set of metrology system parameters are presented. The small measurement box size specification is achieved by selectively constraining one or more of the sets of system parameters during measurement. A subset of measurement system parameters such as illumination wavelength, polarization state, polar angle of incidence, and azimuth angle of incidence is selected for measurement to maintain a smaller measurement box size than would otherwise be achievable if the full, available range of measurement system parameters were utilized in the measurement. In this manner, control of one or more factors that affect measurement box size is realized by constraining the measurement system parameter space. In addition, a subset of measurement signals may be selected to maintain a smaller measurement box size than would otherwise be achievable if all available measurement signals were utilized in the measurement.

19 Claims, 6 Drawing Sheets

(56) References Cited

U.S. PATENT DOCUMENTS

| | | |
|---|---|---|
| 6,429,943 B1 | 8/2002 | Opsal et al. |
| 6,879,449 B2 | 4/2005 | Wang et al. |
| 6,982,791 B2 | 1/2006 | Opsal |
| 7,046,376 B2 | 5/2006 | Sezginer |
| 7,061,614 B2 | 6/2006 | Wang et al. |
| 7,067,818 B2 | 6/2006 | Harrison |
| 7,206,070 B2 | 4/2007 | Opsal |
| 7,215,431 B2 | 5/2007 | Opsal |
| 7,248,364 B2 | 7/2007 | Hebert et al. |
| 7,286,243 B2 | 10/2007 | Rosencwaig |
| 7,317,529 B1 | 1/2008 | Liphard et al. |
| 7,327,457 B2 | 2/2008 | Hebert et al. |
| 7,349,103 B1 | 3/2008 | Balooch et al. |
| 7,417,722 B2 | 8/2008 | Bibbs et al. |
| 7,428,057 B2 | 9/2008 | De Lega et al. |
| 7,492,455 B1 | 2/2009 | Johs et al. |
| 7,567,351 B2 | 7/2009 | Opsal et al. |
| 7,615,752 B2 | 11/2009 | Raymond et al. |
| 7,619,746 B2 | 11/2009 | De Lega |
| 7,755,775 B1 | 7/2010 | Li |
| 8,030,632 B2 | 10/2011 | Norton et al. |
| 8,125,641 B2 | 2/2012 | Li |
| 8,193,468 B2 | 6/2012 | Cordingley et al. |
| 8,214,771 B2 | 7/2012 | Adel et al. |
| 8,319,966 B2 | 11/2012 | Zawaideh et al. |
| 8,502,979 B2 | 8/2013 | Levy et al. |
| 8,525,993 B2 | 9/2013 | Rabello et al. |
| 9,228,943 B2 | 1/2016 | Wang et al. |
| 2001/0033378 A1* | 10/2001 | Rosencwaig et al. ........ 356/369 |
| 2002/0024669 A1 | 2/2002 | Danner et al. |
| 2005/0020073 A1 | 1/2005 | Perry |
| 2005/0041250 A1* | 2/2005 | Opsal ................. G01B 11/0641 356/369 |
| 2006/0187466 A1 | 8/2006 | Li et al. |
| 2006/0244969 A1 | 11/2006 | Ryan et al. |
| 2009/0076782 A1 | 3/2009 | Li et al. |
| 2010/0245819 A1* | 9/2010 | Li .................................. 356/327 |
| 2011/0181868 A1 | 7/2011 | Stokowski |
| 2013/0110477 A1 | 5/2013 | Pandev |
| 2013/0211760 A1 | 8/2013 | Chu et al. |
| 2013/0222795 A1 | 8/2013 | Madsen et al. |

OTHER PUBLICATIONS

Keefer, Mark, et al., The Role of Metrology and Inspection in Semiconductor Processing, http://www.elsevierdirect.com/companions/9781437778731/past_edition_chapters/Role_of_Metrology.pdf.

Boher, P. et al., A new multiple wavelength ellipsometric imager: design, limitations, and applications, Thin Solid Films, 455-456 (2004) 809-818.

Thiel, Brad et al., Advances in CD-Metrology (CD-SAXS, Mueller Matrix based Scatterometry, and SEM), http://www.nist.gov/pml/div683/conference/upload/Thiel_2011.pdf.

* cited by examiner

APPARATUS AND METHOD FOR OPTICAL METROLOGY WITH OPTIMIZED SYSTEM PARAMETERS

CROSS REFERENCE TO RELATED APPLICATION

The present application for patent claims priority under 35 U.S.C. § 119 from U.S. provisional patent application Ser. No. 61/724,722, entitled "Apparatus and Method for Optical Metrology with Optimized System Parameters to Achieve Small Measurement Box Capability," filed Nov. 9, 2012, the subject matter of which is incorporated herein by reference.

TECHNICAL FIELD

The described embodiments relate to metrology systems and methods, and more particularly to methods and systems for improved measurement resolution with smaller measurement box sizes.

BACKGROUND INFORMATION

Semiconductor devices such as logic and memory devices are typically fabricated by a sequence of processing steps applied to a specimen. The various features and multiple structural levels of the semiconductor devices are formed by these processing steps. For example, lithography among others is one semiconductor fabrication process that involves generating a pattern on a semiconductor wafer. Additional examples of semiconductor fabrication processes include, but are not limited to, chemical-mechanical polishing, etch, deposition, and ion implantation. Multiple semiconductor devices may be fabricated on a single semiconductor wafer and then separated into individual semiconductor devices.

A lithographic process, as described above, is performed to selectively remove portions of a resist material overlaying the surface of a wafer, thereby exposing underlying areas of the specimen on which the resist is formed for selective processing such as etching, material deposition, implantation, and the like. Therefore, in many instances, the performance of the lithography process largely determines the characteristics (e.g., dimensions) of the structures formed on the specimen. Consequently, the trend in lithography is to design systems and components (e.g., resist materials) that are capable of forming patterns having ever smaller dimensions.

Inspection processes based on optical metrology are used at various steps during a semiconductor manufacturing process to detect defects on wafers to promote higher yield. Optical metrology techniques offer the potential for high throughput without the risk of sample destruction. A number of optical metrology based techniques including scatterometry implementations and associated analysis algorithms to characterize device geometry have been described. However, it remains a challenge to preserve a small measurement box size. A small measurement box size is especially important in semiconductor inline product metrology where the area available for metrology targets is minimal. The measurement box size refers to the minimum area on the specimen where measurement results are stable and not affected by edge effects (e.g., due to optical diffraction wings) in optical metrology. Hence, the smaller the measurement box size, the smaller the area required for metrology targets.

Some existing approaches concentrate on the optics design only. If the measurement box size specification cannot be achieved with the available optical design, a larger box size is accepted. This can be acceptable for some metrology applications. However, in the semiconductor industry, where wafer space allocated to metrology targets is limited (often, within the scribe line or even within die), the desired box size specification can be often very challenging, such as 30 µm×30 µm or 10 µm×10 µm or similar.

To overcome these challenges, diffraction, aberration, and other limiting effects must be controlled. In one example, a reflective optics ellipsometer that allows for a smaller spot size on the metrology target by reducing chromatic aberrations commonly associated with the use of refractive elements is described by U.S. Pat. No. 5,608,526 entitled "Focused beam spectroscopic ellipsometry method and system," issued Mar. 4, 1997, to KLA-Tencor Corporation, the contents of which are incorporated by reference as if fully set forth herein. In another example, a metrology tool employing an apodizing element is described by U.S. Pat. No. 5,859,424 entitled "Apodizing filter system useful for reducing spot size in optical measurements and other applications," issued Jan. 12, 1999, to KLA-Tencor Corporation, the contents of which are incorporated by reference as if fully set forth herein. The apodizer provides a smoothly varying spatial filter to reduce diffraction tails in the illumination spot on the sample.

In general, it is often desirable to configure metrology systems with multiple angles of incidence and several wavelength bands in an attempt to achieve small measurement spot size. For example, metrology systems having multiple angles of incidence are described by U.S. Pat. No. 6,429,943 entitled "Critical dimension analysis with simultaneous multiple angle of incidence measurements," issued Aug. 6, 2002, to KLA-Tencor Corporation, the contents of which are incorporated by reference as if fully set forth herein. In another example, metrology systems having several wavelength bands are described by U.S. Pat. No. 7,061,614 entitled "Measurement system with separate optimized beam paths," issued Jun. 13, 2006, to KLA-Tencor Corporation, the contents of which are incorporated by reference as if fully set forth herein. However, in some examples, e.g., in composition measurements where it is desirable to perform measurements at oblique, near-Brewster angles of incidence (AOI), geometric scaling effects cause an undesirable enlargement of the measurement box size at large AOIs.

Despite existing approaches designed to control measurement box size, achieving a small measurement box size specification over the full measurement range is very challenging. This is especially the case at both large oblique angles of incidence (AOI), where the incident beam covers a larger area, and at longer wavelengths, where diffraction effects introduce significant limitations.

As lithographic and inspection systems are pressed to higher resolutions, measurement box size becomes a limiting factor in maintaining device yield. Thus, improved methods and systems for achieving a small measurement box size associated with a variety of metrology technologies are desired.

SUMMARY

Methods and systems for meeting metrology objectives with a small measurement box size specification across all sets of system parameters are presented. The small measurement box size specification is achieved by selectively constraining one or more of the sets of system parameters during measurement when the use of data associated with the full range of each of the multiple sets of system parameters results in an undesirable enlargement of the measurement box size.

In one aspect, a subset of measurement system parameters such as illumination wavelength, polarization state, polar angle of incidence, and azimuth angle of incidence is selected for measurement to maintain a smaller measurement box size than would otherwise be achievable if the full, available range of measurement system parameters were utilized in the measurement. In this manner, control of one or more factors that affect measurement box size is realized by constraining the measurement system parameter space.

In one further aspect, a subset of measurement signals is selected, in combination with the subset of measurement parameters to maintain a smaller measurement box size than would otherwise be achievable if all available measurement signals were utilized in the measurement.

In some examples, a multi-dimensional space of available metrology system parameters is identified. The multi-dimensional space includes any two or more of: 1) a range of polar angles of incidence, 2) a range of azimuth angles of incidence, 3) a range of polarization states, and 4) a range of illumination wavelengths. A constrained set of metrology system parameters is selected to achieve a smaller measurement box size than would otherwise be achievable from the available space of metrology system parameters. The constrained set of metrology system parameters includes a subset of the available range of any of the two or more of: 1) the range of polar angles of incidence, 2) the range of azimuth angles of incidence, 3) the range of polarization states, and 4) the range of illumination wavelengths. In some examples the smaller measurement box is less than thirty micrometers in any direction. In some examples the smaller measurement box is less than ten micrometers in any direction. Output signals indicative of a response of the specimen to measurements performed in accordance with the constrained set of metrology system parameters are received. An estimate of a structural parameter of the specimen is determined based at least in part on the received output signals.

In one example, a multiple AOI spectroscopic ellipsometry (or reflectometry) tool can achieve a small metrology box size using different wavelength analysis windows at different AOI. Such a recipe can provide access to both longer wavelengths at smaller AOIs and to shorter wavelengths at larger AOI. In this manner, both of these often incompatible demands of optical metrology of thin films and critical dimensions are satisfied.

In some examples, an illumination system illuminates a specimen with illumination light. The illumination system is operable to generate an available illumination light having any two or more of a range of polar angles of incidence, a range of azimuth angles of incidence, a range of polarization states, and a range of illumination wavelengths. The available illumination light is constrained to a subset of any of the two or more of the range of polar angles of incidence, the range of azimuth angles of incidence, the range of polarization states, and the range of illumination wavelengths to achieve a smaller measurement box size than would otherwise be achievable from the available illumination light. In some examples, the smaller measurement box size is less than thirty micrometers in any direction. In some examples, the smaller measurement box size is less than ten micrometers in any direction.

In some examples, the illumination light is constrained by physically limiting the illumination light delivered to the surface of the specimen to the desired subset of illumination system parameters (e.g., by filtering, etc). In some other examples, the illumination light is constrained by limiting the collection of scattered light to light associated with the desired subset of illumination system parameters. In some other examples, the illumination light is constrained by selecting for measurement analysis only the portion of the output signals associated with the desired subset of illumination system parameters.

In many examples, a constrained set of ranges of system parameter values is determined to achieve a small metrology box size for metrology architectures using multiple angles of incidence. These include but are not limited to multiple-AOI spectroscopic ellipsometry (SE) in its standard or Mueller matrix (MMSE) implementations, multiple-AOI spectroscopic reflectometry, beam profile reflectometry (BPR), or beam profile ellipsometry (BPE), with BPR or BPE technologies used in either one-dimensional or two-dimensional angle-resolved implementations.

The determination of a constrained set of ranges of system parameter values to achieve a small metrology box size is useful for both CD and thin film composition metrology. However, these applications are not limiting, the methods described herein are also useful in overlay metrology applications, focus and dosage monitoring applications, etch monitoring applications, etc.

The determination of a constrained set of ranges of system parameter values to achieve a small metrology box size may be implemented as part of a metrology tool or as part of a fabrication process, and/or fabrication process tool. Examples of fabrication process tools include, but are not limited to, lithographic exposure tools, film deposition tools, implant tools, and etch tools. In this manner, measurement results derived from a constrained set of ranges of system parameter values to achieve a small metrology box size are used to control a fabrication process. In one example, measurement data collected from one or more targets in accordance with the methods described herein is used by a lithography tool to control focus and dosage. In another example, measurement data collected from one or more targets in accordance with the methods described herein is used by an etch tool to control etch process parameters such as etch time.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Modern, complex optical metrology systems are characterized by multiple sets of system parameters such as a range of polar angles of incidence (AOI), a range of azimuth angles of incidence, a range of illumination wavelengths, a range of polarization states, a range of diffraction orders, etc.

Traditionally, measurement data is collected over the full range of each of these multiple sets of system parameters to maximize the amount of measurement data available for analysis to meet the semiconductor device metrology challenge. However, this approach to data collection and analysis often results in an undesirable enlargement of the measurement box size.

The inventor has unexpectedly discovered that in many cases the measurement box size specification can be preserved across all sets of system parameters while meeting the metrology objectives by selectively constraining one or more of the sets of system parameters during measurement. Although it seems counterintuitive to reduce the amount of measurement data available for analysis, by selectively constraining one or more of the sets of system parameters, in many cases, the metrology objectives are achieved with a smaller measurement box size using a reduced data set. In this manner, metrology goals may be achieved (e.g., access to UV, visible, and IR wavelengths, access to oblique AOIs, etc.) without having to expand the size of the metrology box. By enabling a smaller measurement box, metrology target sizes may be reduced in many applications, thus preserving valuable wafer area. In some examples, smaller metrology targets may be located within the scribe lines, within the device area, or in-die.

Figure 1:
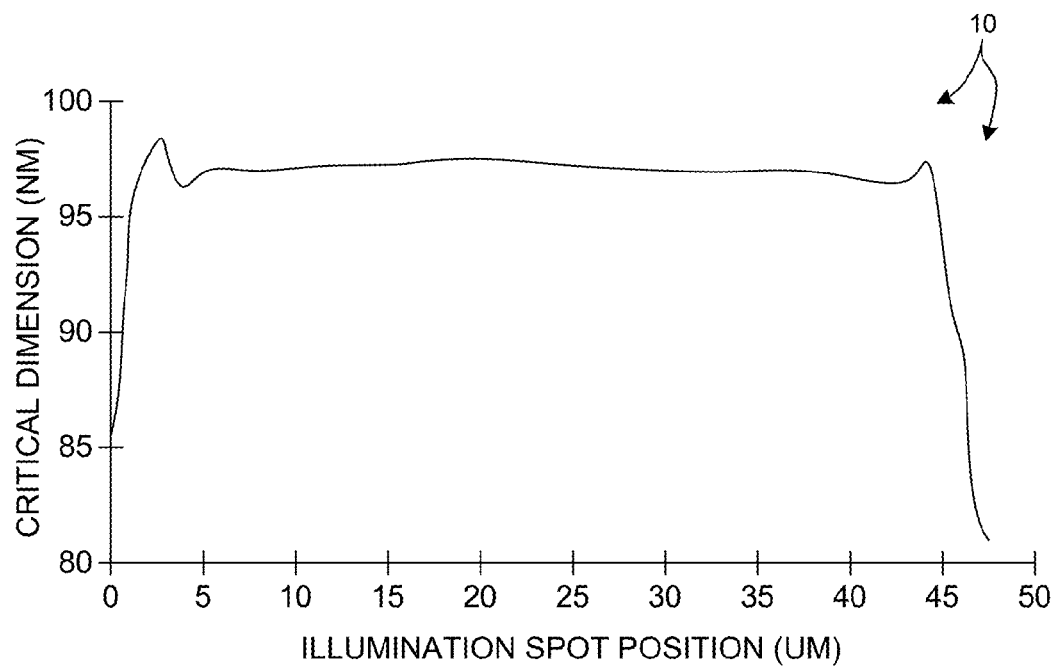
FIG. 1 is a plot 10 illustrative of reflectometer measurement results of a metrology target having a repeated device structure.

By way of example, FIG. 1 illustrates one way to characterize the measurement box size specification for a metrology tool. FIG. 1 is a plot 10 illustrative of reflectometer measurement results of a metrology target having a repeated device structure with a known 50 micrometer by 50 micrometer patterned area. The illumination spot size was scanned across the target. In the example provided, a critical dimension (CD) characterizing the target was measured by identifying a set of target parameters that gave the best fit to measured spectroscopic reflectometer signals. The CD variation is expected to stay within a prescribed range within this test target. Hence, it is presumed that an undesirable interaction of the illumination beam with the edges of the target area is occurring when the measurement results move outside of this range. In the illustrated example, the measurement is stable over a linear scan of approximately 38 micrometers. Therefore, the measurement box size associated with the measurement of the target by the reflectometer along the scan direction (e.g., x-direction) is 12 micrometers (i.e., the difference between the target length in the x-direction, 50 micrometers, and the portion of the target length along the x-direction that was reliably measured, 38 micrometers). In other words, the measurement of a metrology target with a patterned area less than 12 micrometers along the scan direction will not yield useful results due to the interaction of the illumination beam with the edges of the target area. Hence, the minimum measurement box size in this example is 12 micrometers in the x-direction. Note that the measurement box size along the orthogonal direction (e.g., y-direction) may be different and can depend on both the illumination beam properties and the target properties. Note that the use of a reflectometer is provided by way of non-limiting example as other measurement instruments (e.g., ellipsometers, etc.) may also be contemplated. Moreover, the characterization of the impact of target edge on the measurement of the target based on a critical dimension measurement is also provided by way of non-limiting example. Other metrics (e.g., goodness of fit, $\chi^2$, etc.) may also be contemplated.

In one aspect, a subset of measurement system parameters such as illumination wavelength, polarization state, polar angle of incidence, and azimuth angle of incidence is selected for measurement to maintain a smaller measurement box size than would otherwise be achievable if the full, available range of measurement system parameters were utilized in the measurement. In this manner, control of one or more factors that affect measurement box size is realized by constraining the measurement system parameter space.

In one further aspect, a subset of measurement signals is selected, in combination with the subset of measurement parameters to maintain a smaller measurement box size than would otherwise be achievable if all available measurement signals were utilized in the measurement.

In some examples, the constraining of the available ranges of measurement system parameters (e.g., ranges of illumination light parameters) is based at least in part on an analysis of an impact on measurement box size due to any of geometric effects, light diffraction effects, aberration effects, and interactions between the illumination light and the specimen.

Several factors affect measurement box size. In one example, geometric scaling effects impact the measurement box size. Oblique angles of incidence (AOI), although desirable for measurement techniques as such as ellipsometry, contribute to the enlargement of the illumination spot size. The illumination spot size is proportional to 1/cos (AOI), where AOI is measured from an axis normal to the surface under measurement. Hence, as the AOI increases, the projection of the illumination beam onto the surface under inspection grows. For example, an illumination beam producing a 20 µm geometric spot size at normal incidence (AOI=zero degrees) would produce a geometric spot size of approximately 28 micrometers at an AOI of 45 degrees, and a geometric spot size of approximately 58 micrometers at an AOI of 70 degrees. Hence, shorter wavelength illumination light that can be focused to a smaller effective spot size may still meet a small measurement box size specification at larger AOIs, where longer wavelength illumination light may not.

Figure 2:
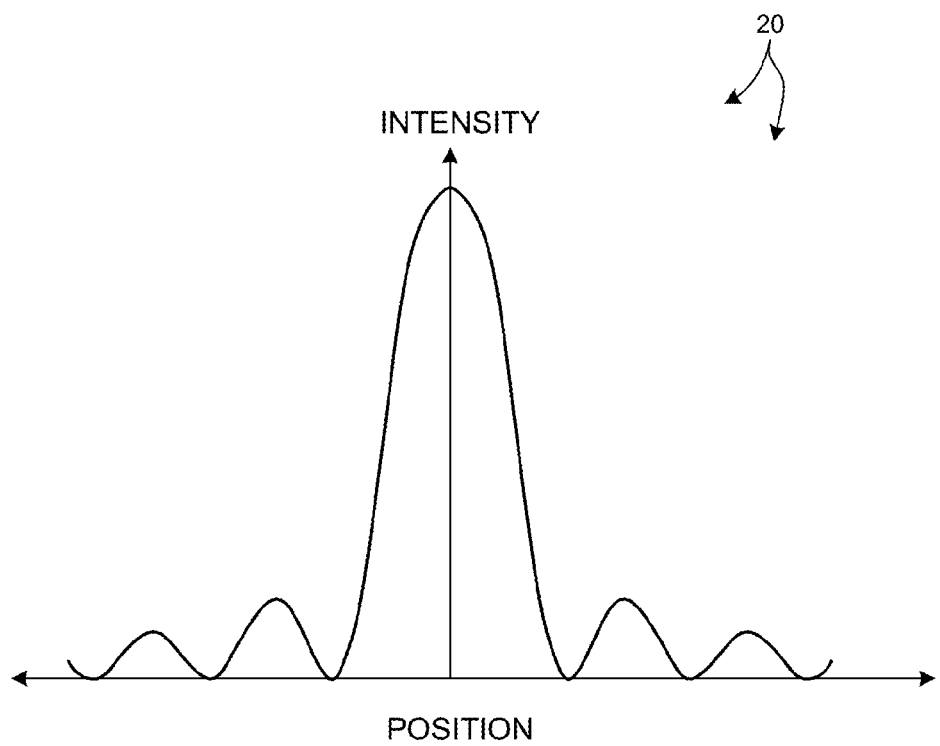
FIG. 2 illustrates a plot 20 of an exemplary intensity distribution of an illumination spot.

In another example, diffractive effects impact measurement box size. It is known that when trying to focus a beam of light onto a small spot, a central bright spot is accompanied by diffraction tails. FIG. 2 illustrates a plot 20 of an exemplary intensity distribution of an illumination spot over the area of incidence of the sample. As illustrated in FIG. 2, the intensity peaks at a central illumination spot, but rather than tapering off to zero away from the center of the beam, the intensity ripples away from the center due to diffraction effects, thus increasing the effective spot size. The effective spot size, as limited by diffraction, scales with the wavelength of the illumination light. Thus, shorter wavelength illumination light can be focused to a smaller effective spot size.

In yet another example, optical aberration effects impact measurement box size. The impact of optical aberration effects also depends on the illumination wavelength. Hence, selection of a particular subset of wavelengths of illumination light can be used to mitigate the effect of optical aberration on measurement box size. In addition, optical aberration is also defined by the details of the optical design. Thus, the selection of a particular subset of wavelengths of illumination light to reduce the impact of optical aberration also depends on the particular optical design. Hence, optical aberrations in a particular system can be compensated better in one range of wavelengths, and less so in another.

Figure 3:
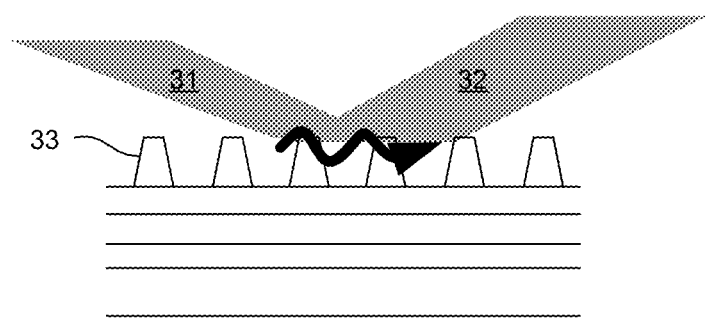
FIG. 3 is a diagram illustrative of an incident beam 31 interacting with a target 33.

In yet another example, the interaction between the illumination light and the target structure itself impacts effective measurement box size. An often overlooked limitation on the effective measurement box size is due to the interaction of the incident beam with the sample. For example, as illustrated in FIG. 3, an incident beam 31 interacts with a target 33 (e.g. a grating target commonly used in CD metrology). The interaction can excite eigenmodes of the structure such as waveguide modes, surface plasmon polaritons, or result in other types of resonant or non-resonant interaction with the target that extend the effective interaction area beyond the illuminated spot size. As illustrated schematically in FIG. 3, this would result in the collection side of the metrology tool detecting an outgoing beam 32 coming from a larger area than the illuminated spot size. This increases the metrology box size compared to the idealistic case when the effect of interaction with the sample is ignored (i.e. a perfectly reflecting mirror surface is assumed). Based on the particular target structure, particular ranges of angles of incidence, azimuth angles, polarization states, and illumination wavelengths can be selected to minimize the enlargement of the measurement box size due to the interaction between the illumination light and the target structure.

In one aspect, a measurement recipe is determined to achieve small-box measurements by selecting a subset of illumination light parameters such as wavelength, polarization state, angle of incidence, and azimuth angle. In some examples, the recipe is based at least in part on an analysis of an impact on measurement box size due to any of geometric effects, light diffraction effects, aberration effects, and interactions between the illumination light and the specimen. In this manner, measurements may be performed within a small measurement box size while overcoming limitations caused by any of geometric effects, light diffraction effects, aberration effects, and interactions between illumination light and the target.

Figure 4:
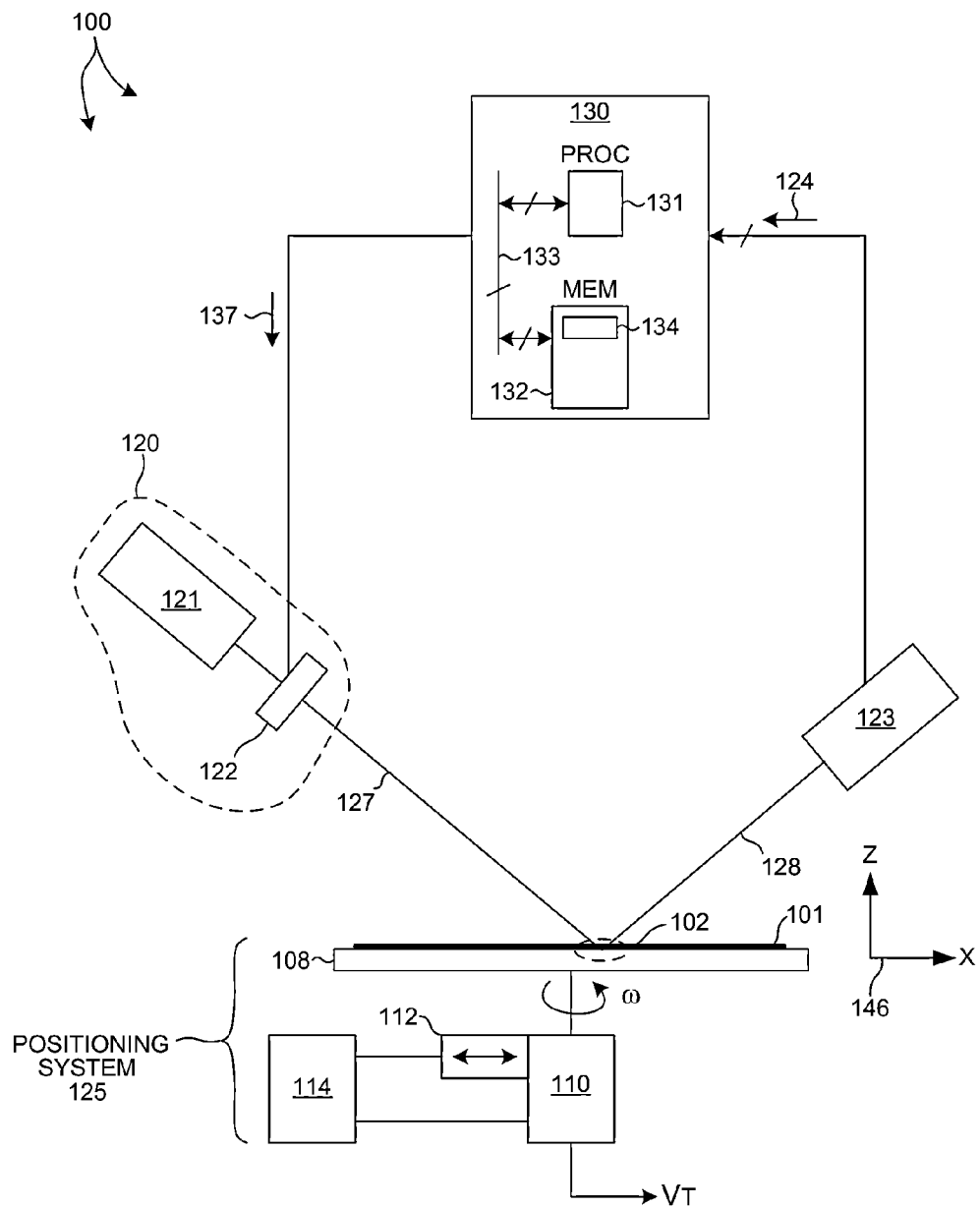
FIG. 4 illustrates a metrology tool 100 for measuring characteristics of a specimen within a small measurement box size.

FIG. 4 illustrates a metrology tool 100 for measuring characteristics of a specimen within a small measurement box size. Limitations caused by any of geometric effects, light diffraction effects, aberration effects, and interactions between illumination light and the target are overcome by performing measurements with a subset of available ranges of system parameters. Available system parameters include illumination wavelength, polarization state, angle of incidence, and azimuth angle. In addition, in a further aspect, a subset of measurement signals is selected, in combination with the subset of measurement parameters to maintain a smaller measurement box size than would otherwise be achievable if all available measurement signals were utilized in the measurement. For example, different measurement signals (e.g., alpha and beta signals from an ellipsometric measurement) may exhibit different sensitivity to measurement box size. Thus, a subset of available measurement signals may be selected to meet a desired measurement box size specification.

In the embodiment depicted in FIG. 4, computing system 130 is configured to implement any of the methods described herein. As shown in FIG. 4, the system 100 may be used to perform optical scatterometry measurements over a measurement box area 102 of a specimen 101 disposed on a specimen positioning system 125. In some embodiments, the measurement box size is thirty micrometers or less in any direction. In some embodiments, the measurement box size is ten micrometers or less in any direction.

In general, and as depicted in FIG. 4, metrology tool 100 includes an optical illumination system 120 and an optical detector 123. Optical illumination system 120 includes an optical illumination source 121 and optical illumination optics 122 configured to shape and direct incident optical illumination beam 127 from optical illumination source 121 to the measurement box 102 of specimen 101. By way of non-limiting example, optical illumination source 121 includes one or more arc lamps, lasers, light emitting diodes, laser driven plasma sources, and laser driven supercontinuum sources, or any combination thereof. In general, any suitable optical illumination source may be contemplated. In some embodiments, optical illumination source 121 is configured to generate illumination light having wavelength components between 100 nanometers and 2000 nanometers.

Illumination optics 122 is configured to collimate or focus incident optical illumination beam 127 to measurement box 102 of specimen 101. In some examples, illumination optics 122 is configured to monochromatize incident optical illumination beam 127. In some embodiments, illumination optics 122 includes one or more optical mirrors, focusing or defocusing optics, optical waveplates, optical apertures, optical monochromators, and optical beam stops, or any combination thereof.

Optical detector 123 collects optical radiation 128 scattered from specimen 101 and generates an output signal 124 indicative of properties of specimen 101 that are sensitive to the incident optical radiation. In some embodiments, scattered optical radiation 128 is collected by optical detector 123 while specimen positioning system 125 locates and orients specimen 101 to produce angularly resolved scattered optical radiation. The optical detector 123 is able to resolve one or more optical photon energies and produces signals for each optical energy component indicative of properties of the specimen. In some embodiments, the optical detector 123 is any of a CCD array, a photodiode array, a CMOS detector and a photomultiplier tube.

Metrology tool 100 also includes a computing system 130 employed to acquire signals 124 generated by optical detector 123 and determine properties of the specimen based at least in part on the acquired signals. As illustrated in FIG. 4, computing system 130 is communicatively coupled to optical detector 123. In one aspect, computing system 130 receives measurement data 124 associated with measurements within a subset of available ranges of system parameters to achieve a small measurement box size. Available system parameters include illumination wavelength, polarization state, angle of incidence, and azimuth angle.

In one example, optical detector 123 is an optical spectrometer and measurement data 124 includes an indication of the measured spectral response of the specimen based on one or more sampling processes implemented by an optical spectrometer.

In a further embodiment, computing system 130 is configured to access model parameters in real-time, employing Real Time Critical Dimensioning (RTCD), or it may access libraries of pre-computed models for determining a value of at least one specimen parameter value associated with the specimen 101. In general, some form of CD-engine may be used to evaluate the difference between assigned CD parameters of a specimen and CD parameters associated with the measured specimen. Exemplary methods and systems for computing specimen parameter values are described in U.S. Pat. No. 7,826,071, issued on Nov. 2, 2010, to KLA-Tencor Corp., the entirety of which is incorporated herein by reference. In general, measurement models associated with not just CD, but also thin film and composition measurements may be applied by computing system 130 to resolve specimen parameter values.

As illustrated in FIG. 4, metrology tool 100 includes a specimen positioning system 125 configured to move specimen 101 under illumination beam 127. Computing system 130 communicates command signals to motion controller 114 of specimen positioning system 125 that indicate the desired position of specimen 101. In response, motion controller 125 generates command signals to the various actuators of specimen positioning system 125 to achieve the desired positioning of specimen 101.

In the embodiment depicted in FIG. 4, specimen positioning system 125 includes a wafer chuck 108, motion controller 114, a rotation stage 110 and a translation stage 112. Specimen 101 is supported on wafer chuck 108. Typically, specimen 101 is located with its geometric center approximately aligned the axis of rotation of rotation stage 110. In this manner, rotation stage 110 spins specimen 101 about its geometric center at a specified angular velocity, ω, within an acceptable tolerance. In addition, translation stage 112 translates the specimen 101 in a direction approximately perpendicular to the axis of rotation of rotation stage 110 at a specified velocity, $V_T$. Motion controller 114 coordinates the spinning of specimen 101 by rotation stage 110 and the translation of specimen 101 by translation stage 112 to achieve the desired scanning motion of specimen 101 within system 100.

It should be recognized that the various steps described throughout the present disclosure may be carried out by a single computer system 130 or, alternatively, a multiple computer system 130. Moreover, different subsystems of the system 100, such as the specimen positioning system 125, may include a computer system suitable for carrying out at least a portion of the steps described herein. Therefore, the aforementioned description should not be interpreted as a limitation on the present invention but merely an illustration. Further, the one or more computing systems 130 may be configured to perform any other step(s) of any of the method embodiments described herein.

In addition, the computer system 130 may be communicatively coupled to the optical detector 123 and the optical illumination system 120 in any manner known in the art. For example, the one or more computing systems 130 may be coupled to computing systems associated with the optical detector 123 and the optical illumination system 120. In another example, any of the optical detector 123 and the optical illumination system 120 may be controlled directly by a single computer system coupled to computer system 130.

The computer system 130 of the combined metrology system 100 may be configured to receive and/or acquire data or information from the subsystems of the system (e.g., optical detector 123, optical illumination system 120, and the like) by a transmission medium that may include wireline and/or wireless portions. In this manner, the transmission medium may serve as a data link between the computer system 130 and other subsystems of the system 100.

Computer system 130 of the metrology system 100 may be configured to receive and/or acquire data or information (e.g., measurement results, modeling inputs, modeling results, etc.) from other systems by a transmission medium that may include wireline and/or wireless portions. In this manner, the transmission medium may serve as a data link between the computer system 130 and other systems (e.g., memory on-board metrology system 100, external memory, or external systems). For example, the computing system 130 may be configured to receive measurement data (e.g., signals 124) from a storage medium (i.e., memory 132 or an external memory) via a data link. For instance, spectral results obtained using a spectrometer of optical detector 123 may be stored in a permanent or semi-permanent memory device (e.g., memory 132 or an external memory). In this regard, the spectral results may be imported from on-board memory or from an external memory system. Moreover, the computer system 130 may send data to other systems via a transmission medium. For instance, constrained measurement parameter ranges determined by computer system 130, or another computing system may be stored in a permanent or semi-permanent memory device (e.g., memory 132 or an external memory). In this regard, results may be exported to another system.

Computing system 130 may include, but is not limited to, a personal computer system, mainframe computer system, workstation, image computer, parallel processor, or any other device known in the art. In general, the term "computing system" may be broadly defined to encompass any device having one or more processors, which execute instructions from a memory medium.

Program instructions 134 implementing methods such as those described herein may be transmitted over a transmission medium such as a wire, cable, or wireless transmission link. For example, as illustrated in FIG. 4, program instructions stored in memory 132 are transmitted to processor 131 over bus 133. Program instructions 134 are stored in a computer readable medium (e.g., memory 132). Exemplary computer-readable media include read-only memory, a random access memory, a magnetic or optical disk, or a magnetic tape.

Although, the development of measurement recipes in accordance with the methods described herein may be realized by computer system 130, it is contemplated that measurement recipes are developed by other computer systems (e.g., a computer system external to metrology tool 100). For example, it is contemplated that measurement recipes are determined in accordance with the methods described herein prior to their use in production environment. In these examples, it is contemplated that the determination of measurement recipes in accordance with the methods described herein is realized by one or more external computer systems.

Figure 5:
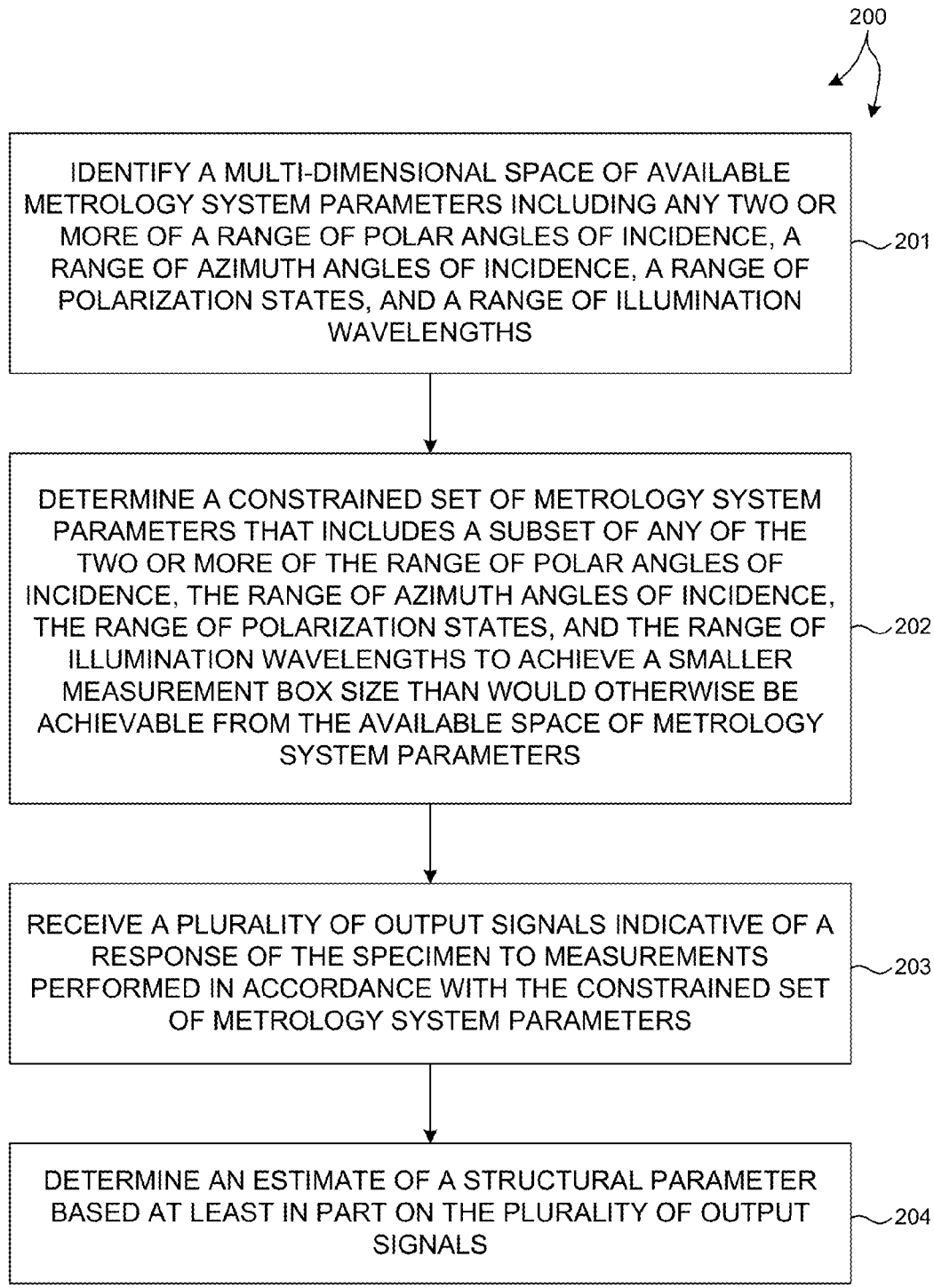
FIG. 5 illustrates a flowchart illustrative of a method 200 of determining a constrained set of metrology system parameters to achieve a smaller measurement box size than would otherwise be achievable from the available space of metrology system parameters.

FIG. 5 illustrates a method 200 suitable for implementation by a computing system (e.g., computing system 130 illustrated in FIG. 4). In one aspect, it is recognized that data processing blocks of method 200 may be carried out via a pre-programmed algorithm executed by one or more processors of computing system 130. While the following description of the method 200 is presented in the context of metrology system 100, it is recognized herein that the particular structural aspects of metrology system 100 do not represent limitations and should be interpreted as illustrative only.

In block 201, computing system 130 identifies the multi-dimensional space of available metrology system parameters. The multi-dimensional space includes any two or more of: 1) a range of polar angles of incidence, 2) a range of azimuth angles of incidence, 3) a range of polarization states, and 4) a range of illumination wavelengths.

In block 202, computing system 130 determines a constrained set of metrology system parameters to achieve a smaller measurement box size than would otherwise be achievable from the available space of metrology system parameters. The constrained set of metrology system parameters includes a subset of the available range of any of the two or more of: 1) the range of polar angles of incidence, 2) the range of azimuth angles of incidence, 3) the range of polarization states, and 4) the range of illumination wavelengths. In some examples the smaller measurement box is less than thirty micrometers in any direction. In some examples the smaller measurement box is less than ten micrometers in any direction.

In block 203, computing system 130 receives a plurality of output signals indicative of a response of the specimen to measurements performed in accordance with the constrained set of metrology system parameters.

In block 204, computing system 130 determines an estimate of a structural parameter of specimen 101 based at least in part on the plurality of output signals generated by optical spectrometer 123.

Computing system 130 may determine the constrained set of metrology system parameters to achieve the desired measurement box size analytically or experimentally.

For example, in general, the effects of oblique angle of incidence, diffraction, aberrations, and interaction between illumination light and the target can be rigorously calculated with a proper electromagnetic simulation engine. For example, such a calculation can be performed using the finite-element method. Alternatively, other approaches may also be contemplated. In this manner, determination of the constrained set of metrology system parameters to achieve small measurement box size across the constrained set of system parameters is achieved based on a model of the effects of finite spot illumination, propagation of light through optical elements, etc. For example, calculations can identify surface or waveguide modes that are excited and impact the box size. Since such modes are normally supported only in a limited range of wavelengths and are polarization-dependent, computing system 130 can identify and exclude metrology system parameters (e.g., particular ranges of illumination wavelength, angles of incidence, azimuth angles, and polarization states) from the measurement recipe to stay within the required measurement box size. Furthermore, different measured signals (ellipsometric, reflectometry, etc.) are affected in different ways by diffraction, aberration, guided waves, etc. In some examples, computing system 130 combines the selection of system parameters with the selection of measured signals to stay within the required measurement box size.

In another example, computing system 130 may determine the constrained set of metrology system parameters to achieve the desired measurement box size experimentally. In some examples, the metrology recipe is based on experimental characterization of the metrology target, or multiple targets. Measurements of the target are performed using the available ranges of system parameters and measurement signals. These measurements are unconstrained in the sense that the measurements are performed with ranges of system parameters that have not yet been constrained to achieve a small measurement box size. In addition, line scan or area scan measurements are performed for box size analysis as described with reference to FIG. 1, by way of non-limiting example. Analysis of the measured data is performed to select ranges of system parameters (i.e., constrain the available ranges of system parameters) and measurement signals to meet the measurement box size specification. This target (or multi-target) specific measurement recipe is then used for subsequent measurements within the desired measurement box.

Figure 6A:
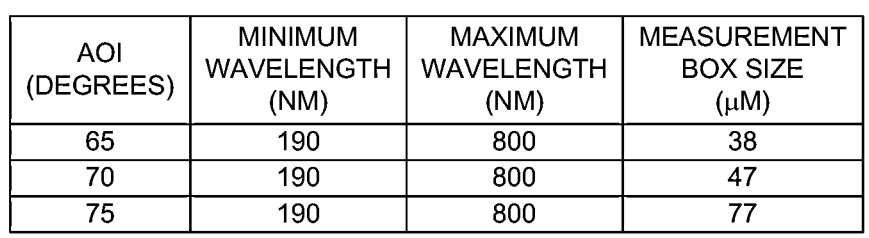
FIG. 6A is a table 30 illustrative of the enlargement of the measurement box size, particularly at larger AOIs, as a result of measurements performed over the full range of available illumination wavelengths.
Figure 6B:
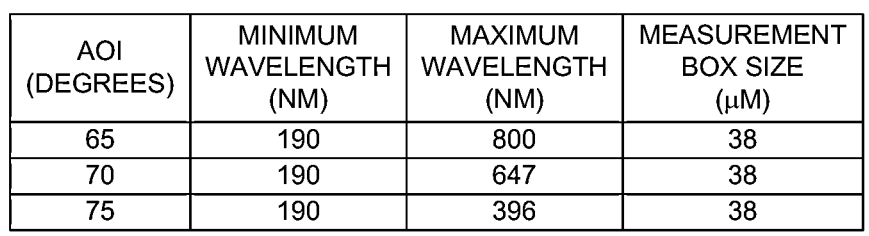
FIG. 6B is a table 40 illustrative of the measurement box size as a result of measurements performed over a constrained range of available illumination wavelengths for different angles of incidence.

As described hereinbefore, the determination of the measurement recipe is driven by the measurement box size goal. Selection of a constrained set of available system parameters, and optionally signals, enables the achievement of that goal. FIGS. 6A-6B illustrate the impact of the selection of a constrained set of available system parameters on measurement box size. Multi-AOI composition or thin film metrology using spectroscopic ellipsometry (e.g., metrology tool 100 illustrated in FIG. 4) often requires measurements at near-Brewster AOIs. As a result of geometric scaling and diffraction effects, these systems traditionally have not been able to achieve a small measurement box size (e.g., less than forty micrometers) across the range of illumination wavelengths used in the SE measurement. For example, as illustrated in FIG. 6A, the full range of available illumination wavelengths (i.e., 190-800 nanometers) is employed at each AOI (i.e., 65, 70, and 75 degrees). In other examples, the range of AOIs is between 55 and 75 degrees. The resulting measurement box size, particularly at larger AOIs, enlarges significantly, and greatly exceeds the measurement box specification (e.g., less than 40 micrometers). However, FIG. 6B illustrates that by selecting a larger range of illumination wavelengths (i.e., 190-800 nanometers) at smaller AOIs (i.e., 65 degrees) and progressively smaller ranges of illumination wavelengths (i.e., 190-647 nanometers and 190-396 nanometers) at larger angles of incidence (i.e., 70 micrometers and 75 micrometers, respectively), the measurement box size stays within a small measurement box size (e.g., less than 40 micrometers). Thus, both shorter (UV) wavelength and longer (IR) wavelengths are accommodating without enlarging the size of the measurement box beyond the desired specification.

As illustrated in FIGS. 6A-6B, a multiple AOI spectroscopic ellipsometry (or reflectometry) tool can achieve a small metrology box size using different wavelength analysis windows at different AOI. Such a recipe can provide access to both longer wavelengths at smaller AOIs and to shorter wavelengths at larger AOI. In this manner, both of these often incompatible demands of optical metrology of thin films and critical dimensions are satisfied. However, this example is not limiting as other measurement examples may be contemplated that achieve a small metrology box size by selecting a constrained set of ranges of system parameters. For example, the SE example illustrated in FIGS. 6A-6B addresses geometric and diffraction limitations, however, further recipe optimization may be achieved by considering aberrations and the interaction of illumination with the target.

In some examples, the methods described herein to achieve a small size measurement box may be used in conjunction with existing focused beam ellipsometer systems such as described by 1) U.S. Pat. No. 5,608,526 entitled "Focused beam spectroscopic ellipsometry method and system," issued Mar. 4, 1997, to KLA-Tencor Corporation, the contents of which are incorporated by reference as if fully set forth herein, and 2) U.S. Pat. No. 5,859,424 entitled "Apodizing filter system useful for reducing spot size in optical measurements and other applications," issued Jan. 12, 1999, to KLA-Tencor Corporation, the contents of which are incorporated by reference as if fully set forth herein.

In many examples, the primary focus is to determine a constrained set of ranges of system parameter values to achieve a small metrology box size for metrology architectures using multiple angles of incidence. These include but are not limited to multiple-AOI spectroscopic ellipsometry (SE) in its standard or Mueller matrix (MMSE) implementations, multiple-AOI spectroscopic reflectometry, beam profile reflectometry (BPR), or beam profile ellipsometry (BPE), with BPR or BPE technologies used in either one-dimensional or two-dimensional angle-resolved implementations.

However, in general the methods described herein are compatible with all known optical metrology tools individually, or in combination as part of a combined measurement analysis. Such optical metrology tool include, by way of non-limiting example, spectroscopic ellipsometers, spectroscopic reflectometers, angle-resolved reflectometers and ellipsometers, spectroscopic scatterometry, scatterometry overlay, beam profile reflectometry, (angle and polarization resolved), beam profile ellipsometry, single or multiple discrete wavelength ellipsometry, multiple angle of incidence ellipsometry, and spectroscopic polarimetry.

Figure 7:
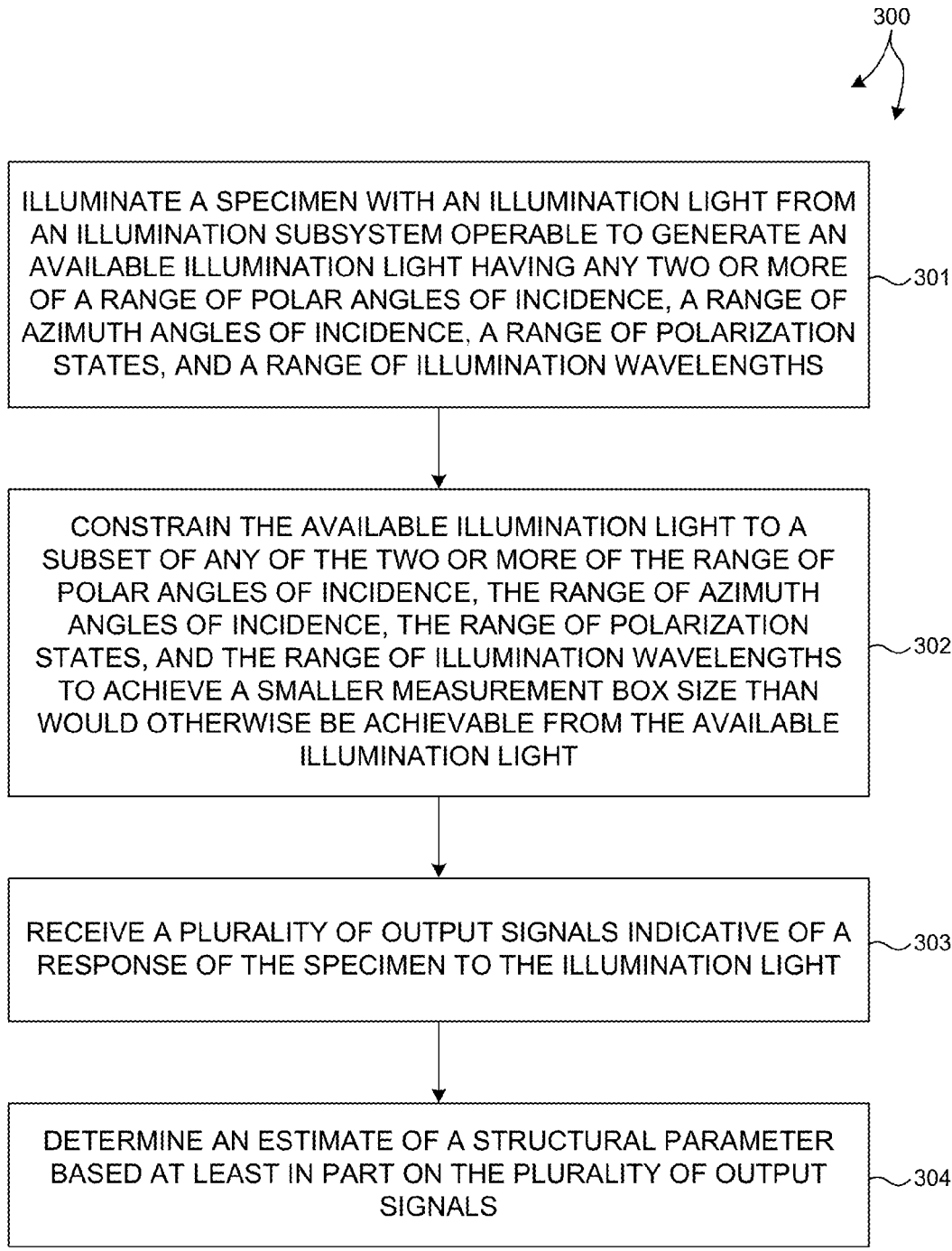
FIG. 7 is a flowchart illustrative of a method 300 of constraining an amount of available illumination light to a subset of illumination system parameters to achieve a smaller measurement box size than would otherwise be achievable from the available illumination light.

FIG. 7 illustrates a method 300 suitable for implementation by a metrology system (e.g., metrology tool 100 illustrated in FIG. 4). In one aspect, it is recognized that data processing blocks of method 300 may be carried out via a pre-programmed algorithm executed by one or more processors of computing system 130. While the following description of the method 300 is presented in the context of metrology system 100, it is recognized herein that the particular structural aspects of metrology system 100 do not represent limitations and should be interpreted as illustrative only.

In block 301, illumination system 120 illuminates a specimen with illumination light. The illumination system 120 is operable to generate an available illumination light having any two or more of a range of polar angles of incidence, a range of azimuth angles of incidence, a range of polarization states, and a range of illumination wavelengths.

In block 302, computing system 130 constrains the available illumination light to a subset of any of the two or more of the range of polar angles of incidence, the range of azimuth angles of incidence, the range of polarization states, and the range of illumination wavelengths to achieve a smaller measurement box size than would otherwise be achievable from the available illumination light. In some examples, the smaller measurement box size is less than thirty micrometers in any direction. In some examples, the smaller measurement box size is less than ten micrometers in any direction. In some examples, computing system 130 constrains the available illumination light by communicating a command signal 137 to illumination system 120 to physically limit the illumination light delivered to the surface of the specimen 101 to the desired subset of illumination system parameters (e.g., by filtering, etc). In some other examples, computing system 130 constrains the available illumination light by sending a command signal (not shown) to spectroscopic ellipsometer 123 to limit the collection of scattered light to light associated with the desired subset of illumination system parameters. In some other examples, computing system 130 constrains the available illumination light by selecting only the portion of output signals 124 associated with the desired subset of illumination system parameters for measurement analysis.

In block 303, optical spectrometer 123 generates a plurality of output signals indicative of a response of the specimen to the illumination light.

In block 304, computing system 130 determines an estimate of a structural parameter of specimen 101 based at least in part on the plurality of output signals generated by optical spectrometer 123.

As discussed hereinbefore, the determination of a constrained set of ranges of system parameter values to achieve a small metrology box size is useful for CD metrology, thin film metrology, and composition metrology. However, these applications are not limiting, the methods described herein are also useful in overlay metrology applications, focus and dosage monitoring applications, etch monitoring applications, etc.

As discussed hereinbefore, the determination of a constrained set of ranges of system parameter values to achieve a small metrology box size is implemented as part of a metrology tool (e.g., metrology tool 100). However, the determination of a constrained set of ranges of system parameter values to achieve a small metrology box size measurement capability may also be implemented as part of a fabrication process, and/or fabrication process tool. Examples of fabrication process tools include, but are not limited to, lithographic exposure tools, film deposition tools, implant tools, and etch tools. In this manner, measurement results derived from a constrained set of ranges of system parameter values to achieve a small metrology box size are used to control a fabrication process. In one example, measurement data collected from one or more targets in accordance with the methods described herein is used by a lithography tool to control focus and dosage. In another example, measurement data collected from one or more targets in accordance with the methods described herein is used by an etch tool to control etch process parameters such as etch time.

As described herein, the term "critical dimension" includes any critical dimension of a structure (e.g., bottom critical dimension, middle critical dimension, top critical dimension, sidewall angle, grating height, etc.), a critical dimension between any two or more structures (e.g., distance between two structures), and a displacement between two or more structures (e.g., overlay displacement between overlaying grating structures, etc.). Structures may include three dimensional structures, patterned structures, overlay structures, etc.

As described herein, the term "critical dimension application" or "critical dimension measurement application" includes any critical dimension measurement.

As described herein, the term "metrology system" includes any system employed at least in part to characterize a specimen in any aspect, including critical dimension applications and overlay metrology applications. However, such terms of art do not limit the scope of the term "metrology system" as described herein. In addition, the metrology system 100 may be configured for measurement of patterned wafers and/or unpatterned wafers. The metrology system may be configured as a LED inspection tool, solar inspection tool, edge inspection tool, backside inspection tool, macro-inspection tool, or multi-mode inspection tool (involving data from one or more platforms simultaneously), and any other metrology or inspection tool that benefits from the calibration of system parameters based on critical dimension data.

Various embodiments are described herein for a semiconductor processing system (e.g., an inspection system or a lithography system) that may be used for processing a specimen. The term "specimen" is used herein to refer to a wafer, a reticle, or any other sample that may be processed (e.g., printed or inspected for defects) by means known in the art.

As used herein, the term "wafer" generally refers to substrates formed of a semiconductor or non-semiconductor material. Examples include, but are not limited to, monocrystalline silicon, gallium arsenide, and indium phosphide. Such substrates may be commonly found and/or processed in semiconductor fabrication facilities. In some cases, a wafer may include only the substrate (i.e., bare wafer). Alternatively, a wafer may include one or more layers of different materials formed upon a substrate. One or more layers formed on a wafer may be "patterned" or "unpatterned." For example, a wafer may include a plurality of dies having repeatable pattern features.

A "reticle" may be a reticle at any stage of a reticle fabrication process, or a completed reticle that may or may not be released for use in a semiconductor fabrication facility. A reticle, or a "mask," is generally defined as a substantially transparent substrate having substantially opaque regions formed thereon and configured in a pattern. The substrate may include, for example, a glass material such as amorphous $SiO_2$. A reticle may be disposed above a resist-covered wafer during an exposure step of a lithography process such that the pattern on the reticle may be transferred to the resist.

One or more layers formed on a wafer may be patterned or unpatterned. For example, a wafer may include a plurality of dies, each having repeatable pattern features. Formation and processing of such layers of material may ultimately result in completed devices. Many different types of devices may be formed on a wafer, and the term wafer as used herein is intended to encompass a wafer on which any type of device known in the art is being fabricated.

In one or more exemplary embodiments, the functions described may be implemented in hardware, software, firmware, or any combination thereof. If implemented in software, the functions may be stored on or transmitted over as one of more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM of other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A method comprising:
    illuminating a specimen with an illumination light from an illumination subsystem operable to generate an available illumination light having any two or more of a range of polar angles of incidence, a range of azimuth angles of incidence, a range of polarization states, and a range of illumination wavelengths;
    constraining the available illumination light to a subset of any of the two or more of the range of polar angles of incidence, the range of azimuth angles of incidence, the range of polarization states, and the range of illumination wavelengths to minimize a measurement box size and achieve a smaller measurement box size than would otherwise be achievable from the available illumination light, wherein the constraining the illumination light involves determining a subset of illumination wavelengths associated with each of a plurality of angles of incidence that minimizes the measurement box size;
    generating a plurality of output signals indicative of a response of the specimen to the illumination light, wherein each output signal is indicative of an amount of light diffracted from the specimen at a different angle of incidence; and
    determining an estimate of a structural parameter based at least in part on the plurality of output signals.

2. The method of claim 1, further comprising:
    constraining a set of available measurement signals associated with different measurement technologies.

3. The method of claim 1, wherein the different angles of incidence range between 55 and 75 degrees, and wherein the range of illumination wavelengths is between 100 nanometers and 2000 nanometers.

4. The method of claim 3, wherein the subset of illumination wavelengths associated with an angle of incidence greater than 70 degrees is between 190 nanometers and 650 nanometers, and wherein the subset of illumination wavelengths associated with an angle of incidence less than 70 degrees is between 190 nanometers and 800 nanometers.

5. The method of claim 1, wherein the constraining of the illumination light involves any of physically limiting the illumination light delivered to the specimen to the subset, limiting collection of scattered light to scattered light associated with the subset, and selecting only a portion of the output signals associated with the subset for measurement analysis.

6. The method of claim 1, wherein the smaller measurement box size is less than 30 micrometers in any direction.

7. The method of claim 1, wherein the smaller measurement box size is less than 10 micrometers in any direction.

8. The method of claim 1, wherein the constraining the available illumination light is based at least in part on an analysis of an impact on measurement box size due to any of geometric effects, light diffraction effects, aberration effects, and interactions between the illumination light and the specimen.

9. A method comprising:
illuminating a specimen with an illumination light from an illumination subsystem operable to generate an available illumination light having any two or more of a range of polar angles of incidence, a range of azimuth angles of incidence, a range of polarization states, and a range of illumination wavelengths;
constraining the available illumination light to a subset of any of the two or more of the range of polar angles of incidence, the range of azimuth angles of incidence, the range of polarization states, and the range of illumination wavelengths to minimize a measurement box size and achieve a smaller measurement box size than would otherwise be achievable from the available illumination light, wherein the constraining the available illumination light to minimize the measurement box size involves:
  determining an electromagnetic model of an interaction between the illumination light and the specimen; and
  selecting the subset of any of the two or more of the range of polar angles of incidence, the range of azimuth angles of incidence, the range of polarization states, and the range of illumination wavelengths that minimizes the enlargement of the measurement box size predicted by the electromagnetic model due to the interaction between the illumination light and the target structure;
generating a plurality of output signals indicative of a response of the specimen to the illumination light; and
determining an estimate of a structural parameter based at least in part on the plurality of output signals.

10. A method comprising:
illuminating a specimen with an illumination light from an illumination subsystem operable to generate an available illumination light having any two or more of a range of polar angles of incidence, a range of azimuth angles of incidence, a range of polarization states, and a range of illumination wavelengths;
constraining the available illumination light to a subset of any of the two or more of the range of polar angles of incidence, the range of azimuth angles of incidence, the range of polarization states, and the range of illumination wavelengths to minimize a measurement box size and achieve a smaller measurement box size than would otherwise be achievable from the available illumination light, wherein the constraining the available illumination light to minimize the measurement box size involves:
  performing a plurality of measurements of the specimen with the available illumination light;
  determining a plurality of measurement box sizes each associated with each of the plurality of measurements; and
  selecting the subset of any of the two or more of the range of polar angles of incidence, the range of azimuth angles of incidence, the range of polarization states, and the range of illumination wavelengths that minimizes the enlargement of the measurement box size based on the determined measurement box sizes;
generating a plurality of output signals indicative of a response of the specimen to the illumination light; and
determining an estimate of a structural parameter based at least in part on the plurality of output signals.

11. A method comprising:
identifying a multi-dimensional space of available metrology system parameters including any two or more of a range of polar angles of incidence, a range of azimuth angles of incidence, a range of polarization states, and a range of illumination wavelengths;
determining a constrained set of metrology system parameters that includes a subset of any of the two or more of the range of polar angles of incidence, the range of azimuth angles of incidence, the range of polarization states, and the range of illumination wavelengths to minimize a measurement box size and achieve a smaller measurement box size than would otherwise be achievable from the available multi-dimensional space of metrology system parameters, wherein the determining a constrained set of metrology system parameters is based at least in part on an analysis of an impact on measurement box size due to any of geometric effects, light diffraction effects, aberration effects, and interactions between the illumination light and the specimen;
illuminating a specimen;
receiving a plurality of output signals indicative of a response of the specimen to measurements performed in accordance with the constrained set of metrology system parameters; and
determining an estimate of a structural parameter based at least in part on the plurality of output signals.

12. The method of claim 11, wherein the determining of the constrained set of metrology system parameters involves any of an experimental analysis and a model-based analysis.

13. The method of claim 11, wherein the smaller measurement box size is less than 30 micrometers in any direction.

14. The method of claim 11, wherein the smaller measurement box size is less than 10 micrometers in any direction.

15. An apparatus comprising:
an illumination subsystem operable to generate an available illumination light having any two or more of a range of polar angles of incidence, a range of azimuth angles of incidence, a range of polarization states, and a range of illumination wavelengths and illuminate a specimen with an illumination light;
a computer subsystem configured to:
  constrain the available illumination light to a subset of any of the two or more of the range of polar angles of incidence, the range of azimuth angles of incidence, the range of polarization states, and the range of illumination wavelengths to minimize a measurement box size and achieve a smaller measurement box size than would otherwise be achievable from the available illumination light, wherein the constraining of the available illumination light is based at least in part on an analysis of an impact on measurement box size due to any of geometric effects, light diffraction effects, aberration effects, and interactions between the illumination light and the specimen, and
  determine an estimate of a structural parameter of the specimen based at least in part on a plurality of output signals; and a detector operable to generate the plurality of output signals indicative of a response of the specimen to the subset of the available illumination light.

16. The apparatus of claim 15, wherein the computer subsystem is further configured to constrain a set of available measurement signals associated with different measurement technologies.

17. The apparatus of claim 15, wherein the constraining of the illumination light involves any of physically limiting the illumination light delivered to the specimen to the subset, limiting collection of scattered light to scattered light associated with the subset, and selecting only a portion of the output signals associated with the subset for measurement analysis.

18. The apparatus of claim 15, wherein the smaller measurement box size is less than 30 micrometers in any direction.

19. The apparatus of claim 15, wherein the smaller measurement box size is less than 10 micrometers in any direction.

* * * * *